(12) United States Patent
Knoener

(10) Patent No.: US 8,642,924 B2
(45) Date of Patent: Feb. 4, 2014

(54) WELDING ARC TERMINATION METHOD AND SYSTEM

(75) Inventor: Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 250 days.

(21) Appl. No.: 13/023,928

(22) Filed: Feb. 9, 2011

(65) Prior Publication Data

US 2011/0248010 A1 Oct. 13, 2011

Related U.S. Application Data

(60) Provisional application No. 61/322,612, filed on Apr. 9, 2010.

(51) Int. Cl.
*B23K 9/12* (2006.01)
*B23K 31/02* (2006.01)

(52) U.S. Cl.
USPC ....................................... 219/137.7; 219/61.5

(58) Field of Classification Search
USPC ............... 219/133, 130.1, 130.5, 617, 54–57, 219/61.5, 86.7, 91.1, 111, 136
See application file for complete search history.

(56) References Cited

U.S. PATENT DOCUMENTS

| | | | | |
|---|---|---|---|---|
| 3,602,684 A | * | 8/1971 | Friess | 219/110 |
| 3,984,654 A | * | 10/1976 | Hoffman et al. | 219/130.32 |
| 4,493,040 A | * | 1/1985 | Vanderhelst | 700/212 |
| 4,517,439 A | * | 5/1985 | Colley | 219/130.33 |
| 5,753,888 A | * | 5/1998 | Eldridge | 219/130.4 |
| 2006/0243718 A1 | * | 11/2006 | Enyedy | 219/137.71 |
| 2007/0257015 A1 | | 11/2007 | Fosbinder et al. | |

FOREIGN PATENT DOCUMENTS

| EP | 0784374 A2 | 7/1997 |
| GB | 1317893 A | 5/1973 |

OTHER PUBLICATIONS

International Search Report for application No. PCT/US2011/030786 mailed Jul. 7, 2011.

* cited by examiner

*Primary Examiner* — Tu B Hoang
*Assistant Examiner* — Michael Laflame, Jr.
(74) *Attorney, Agent, or Firm* — Fletcher Yoder P.C.

(57) ABSTRACT

A system and method for welding arc termination are provided. In an exemplary embodiment, a method for controlling a welding process includes receiving a signal indicating an operator intention to terminate a welding arc and stopping advance of a welding wire in response to the signal. The method also includes reducing a conduction angle for switching of solid state switches that generate welding power in response to the signal.

20 Claims, 4 Drawing Sheets

WELDING ARC TERMINATION METHOD AND SYSTEM

CROSS REFERENCE TO RELATED APPLICATIONS

This application is a Non-Provisional Patent Application of U.S. Provisional Patent Application No. 61/322,612 entitled "Method For Improving Arc Ends", filed Apr. 9, 2010, which is herein incorporated by reference.

BACKGROUND

The invention relates generally to welding systems and, more particularly, to methods and systems that may be utilized to terminate a welding arc generated by a welding system.

Welding is a process that has become ubiquitous in various industries for a variety of types of applications. For example, welding processes, such as tungsten inert gas (TIG) welding and metal inert gas (MIG) welding, are utilized in industries such as shipbuilding, construction, manufacturing, and so forth. Welding power sources are utilized to provide power for such applications. Welding power sources typically include capacitor banks that are charged during a welding operation and should be discharged when a welding operation is completed. Often a burden resistor is installed across the capacitor bank to discharge the capacitor bank. Unfortunately, a capacitor bank is not always discharged after a welding operation is complete and before an operator resumes a welding operation by making contact between a welding wire and a workpiece. When this occurs, the stored energy in the capacitor bank may cause the welding wire to stick to the workpiece or cause a mark on the workpiece. Accordingly, there exists a need for welding systems that overcome such disadvantages.

BRIEF DESCRIPTION

In an exemplary embodiment, a method for controlling a welding process includes receiving a signal indicating an operator intention to terminate a welding arc and stopping advance of a welding wire in response to the signal. The method also includes reducing a conduction angle for switching of solid state switches that generate welding power in response to the signal.

In another embodiment, a welding system includes a welding power supply configured to generate welding power for an arc welding application. The welding power supply includes solid state switches that generate welding power and a capacitive circuit coupled to the welding power. The welding system also includes a welding torch for initiating feed of a welding wire for the arc welding application. The welding system includes control circuitry configured to receive a signal from the torch indicating an operator intention to terminate a welding arc, to stop advance of a welding wire in response to the signal, and to reduce a conduction angle for switching of solid state switches that generate welding power in response to the signal to dissipate energy stored in the capacitive circuit through the welding arc.

In another embodiment, a computer-implemented method for controlling a welding process includes receiving a signal indicating an operator intention to terminate a welding arc. The method also includes stopping advance of a welding wire in response to the signal and reducing power output in response to the signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a weld arc termination system and method are provided. For example, power to a weld arc may be incrementally decreased after an operator releases a welding torch trigger in order to discharge a capacitive circuit coupled to the welding output. Thus, the welding arc continues over a brief time. In one embodiment, a method for controlling a welding process includes receiving a signal indicating an operator intention to terminate a welding arc and stopping advance of a welding wire in response to the signal. The method also includes reducing a conduction angle for switching of solid state switches that generate welding power in response to the signal.

Figure 1:
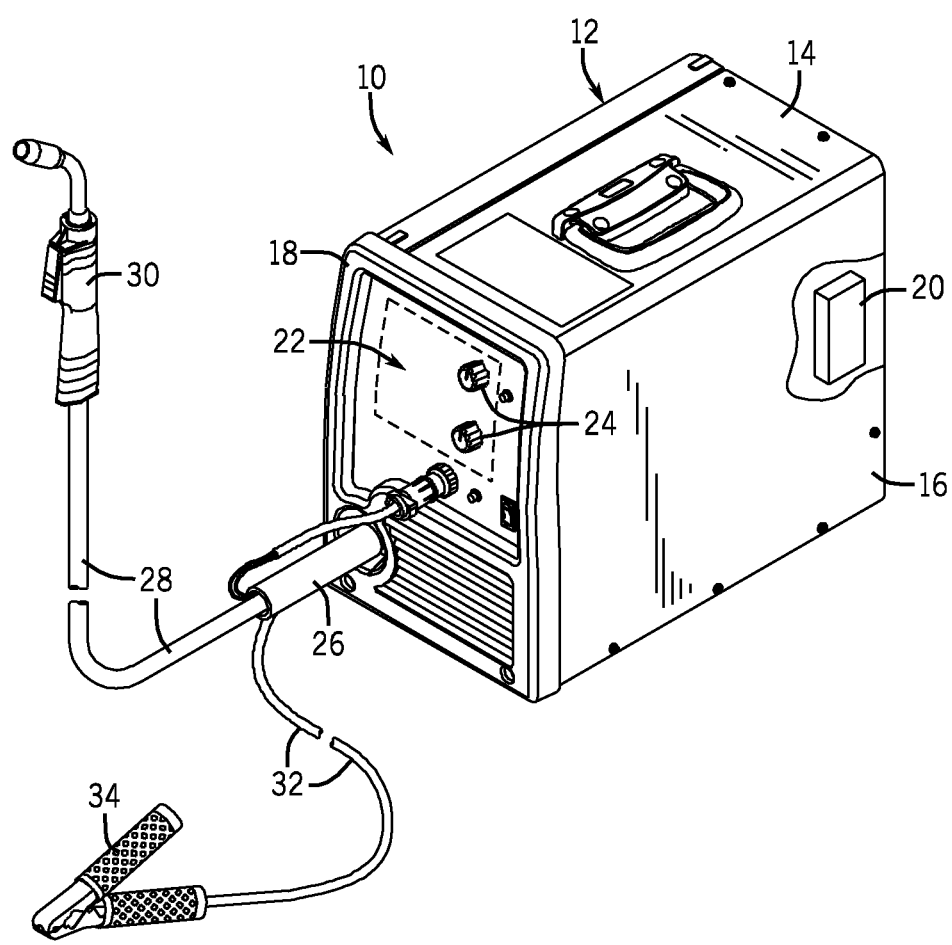
FIG. 1 is a perspective view of an exemplary welding power source in accordance with aspects of the present invention.

Turning now to the drawings, FIG. 1 is a perspective view of an exemplary welding power source 10 configured for use in a gas metal arc welding (GMAW) process or a flux cored welding (FCAW) process. The welding power source 10 includes a housing 12 including a top panel 14, a side panel 16, and a front panel 18. The top panel 14 may include a handle that facilitates transport of the welding power source 10 from one location to another by an operator if desired. The side panel 16 includes a breakaway view illustrating a controller 20 configured to control operation of the welding power source 10. The front panel 18 includes a control panel 22 adapted to allow an operator to set one or more parameters of the welding process, for example, via knobs 24 (or buttons, touchscreens, etc.).

In certain embodiments, the welding power source 10 includes the functionality of a wire feeder. Such embodiments may include a wire drive configured to receive control signals to drive a wire spool. The wire drive feeds wire for the welding operation. In another embodiment, a separate wire feeder may attach to the welding power source 10. Such a separate wire feeder may also include a wire drive and a wire spool.

A main electrical connector 26 couples to the welding power source 10 via the front panel 18. A cable 28 extends from the main connector 26 to a welding torch 30 configured to be utilized in a welding operation to establish a welding arc. A second cable 32 is attached inside the welding power source 10 through an aperture in the front panel 18 and terminates in a clamp 34 that is adapted to clamp to the workpiece during a welding operation to close the circuit between the welding power source 10, the welding torch 30, and the workpiece. During such an operation, the welding power source 10 is configured to receive primary power from a primary power supply, such as an AC power source (e.g., the power grid, engine-generator, etc.), to condition such incoming power, and to output a weld power output appropriate for use in the welding operation. Accordingly, the power source 10 is configured to receive and condition a primary power input including reducing a conduction angle for switching solid state switches that generate a welding power. As described in detail below, embodiments of the welding power sources disclosed herein are adapted to reduce the likelihood of marring of the workpiece due to a charged capacitive circuit.

Figure 2:
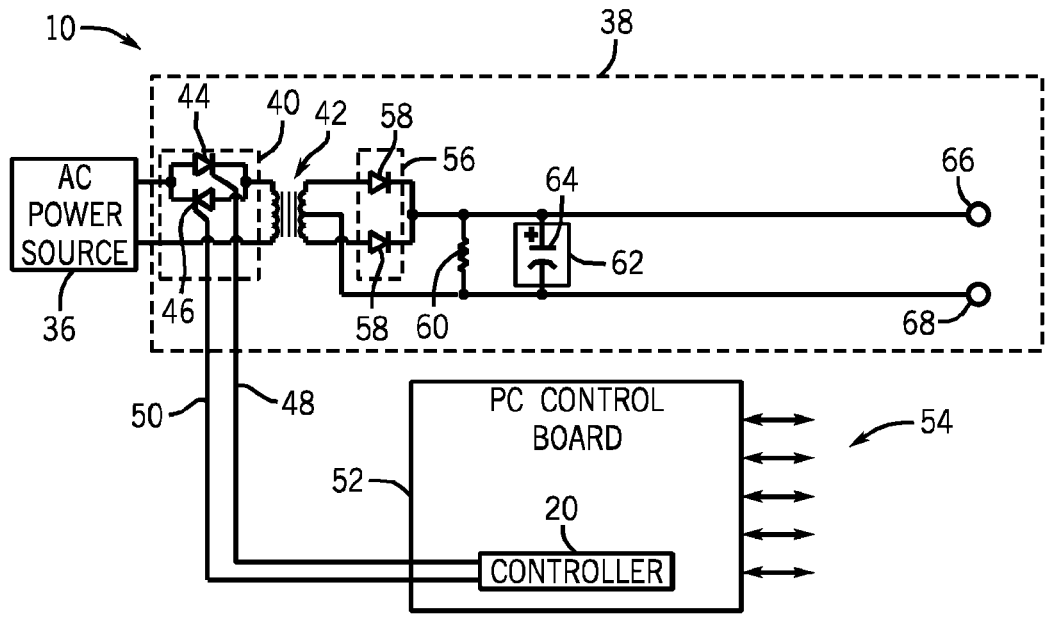
FIG. 2 is a diagrammatical view of exemplary circuitry that may be used in the welding power source of FIG. 1.

FIG. 2 is diagrammatical view of exemplary circuitry that may be used in the welding power source 10 of FIG. 1. An AC power source 36 is coupled to weld power generation circuitry 38. The weld power generation circuitry 38 includes solid state switching circuitry 40 coupled to a transformer 42. The solid state switching circuitry 40 includes SCRs 44 and 46. However, in certain embodiments the switching circuitry 40 may contain other solid state switches such as transistors, thyristors, triacs, or other switches. Furthermore, the switching circuitry 40 may contain one or more SCRs. The SCRs 44 and 46 are connected to the controller 20 via connections 48 and 50 respectively, thereby connecting the gates of the SCRs to the controller 20. The controller 20 is located within a PC control board 52 and is configured to control a conduction angle of the SCRs 44 and 46. Furthermore, the controller 20 may be programmed to control other aspects of a welding process. The PC control board 52 may include potentiometers used by the controller 20 to adjust the conduction angle. Further, the PC control board 52 is configured for a variety of other circuitry (e.g., spool gun circuitry, trigger circuitry, thermal overload circuitry, welding termination signal, wire advancement signal, etc.) via connections 54.

The transformer 42 includes a primary winding and a secondary winding. The solid state switching circuitry 40 is disposed on the primary winding side of the transformer 42. The weld power generation circuitry 38 also includes a diode bridge circuitry 56 which includes diodes 58. A resistor 60 and a capacitive circuit 62 or capacitor bank are disposed on the secondary winding side of the transformer 42 and are coupled in parallel to each other. The capacitive circuit 62 includes one or more capacitors 64. Output terminals 66 and 68 are coupled across the capacitive circuit 62 for providing power for a welding operation.

During a welding operation, the controller 20 controls power supplied to the transformer 42 by applying control signals to the gates of the SCRs 44 and 46 via connections 48 and 50. Such signals control the conduction angle for switching the SCRs 44 and 46. For example, the SCRs 44 and 46 may have a control signal applied that allows current to pass through them when the conduction angle is approximately 180, 160, 100, 55, 20, or 0 degrees. That is, if each SCR allows a conduction angle of 180 degrees, approximately 100 percent of the current is allowed to pass through the SCRs 44 and 46. Conversely, when the conduction angle is 0 degrees, approximately 0 percent of the current is allowed to pass through the SCRs 44 and 46. The conduction angle will be between these two limits.

A welding operation may begin with an operator pressing a trigger on the welding torch. When the operator presses the trigger, a weld signal is sent to the PC control board 52 via the signal connections 54. The weld signal signifies a desire to begin a welding arc and causes the controller 20 to adjust the conduction angle allowed by SCRs 44 and 46 to begin the supply of welding power. A maximum and minimum conduction angle may be established and maintained by the controller 20. In certain embodiments, the maximum conduction angle may be approximately 125, 150, 160, or 175 degrees while the minimum conduction angle may be approximately 0, 15, 20, or 40 degrees. For example, the maximum conduction angle may be approximately 160 degrees while the minimum conduction angle may be approximately 20 degrees.

The conduction angle is set by the controller 20 such that a desired voltage extends across a welding arc, which may be defined by the welding process performed. In some welding processes and systems, the voltage may be set by the operator using the control panel on the welding power supply 10. As such, the controller 20 adjusts the conduction angle during the welding operation to maintain the arc in accordance with the selected welding process. For example, the conduction angle may adjust between approximately 100 to 150, 90 to 170, or 80 to 160 degrees while the operator is pressing the trigger during the welding operation.

When the welding operation begins, the capacitive circuit 62 becomes charged. The charge on the capacitive circuit 62 is maintained while the operator presses the trigger on the welding torch and maintains a welding arc. After an operator completes a welding operation, the operator releases the trigger on the welding torch. The release of the trigger causes a weld signal to be sent to the PC control board 52 via the signal connections 54 signifying a desire to end the welding arc. In response to the weld signal, the controller 20 stops wire from advancing to the welding torch. Furthermore, the controller 20 decreases the conduction angle from a current angle to a fixed minimum angle over a predetermined time. For example, in a presently contemplated embodiment, the controller 20 may ramp the conduction angle from a current angle of approximately 135 degrees to a fixed minimum angle of approximately 20 degrees over approximately 35 milliseconds.

As the conduction angle decreases, the capacitive circuit 62 begins to discharge while the welding arc is maintained. The capacitive circuit 62 continues to discharge through the welding arc as the conduction angle decreases to approximately 20 degrees. The residual charge on the capacitive circuit 62 is discharged by the resistor 60. Further, as may be appreciated, the resistor 60 is constantly dissipating power during a welding operation.

In other embodiments, the conduction angle may be decreased at a fixed rate not related to a predetermined time. For example, the conduction angle may decrease at approximately a rate of 5 degrees per millisecond. The rate of conduction angle decrease may be any rate, such as 1, 2, 5, or 20 degrees per millisecond.

Figure 3:
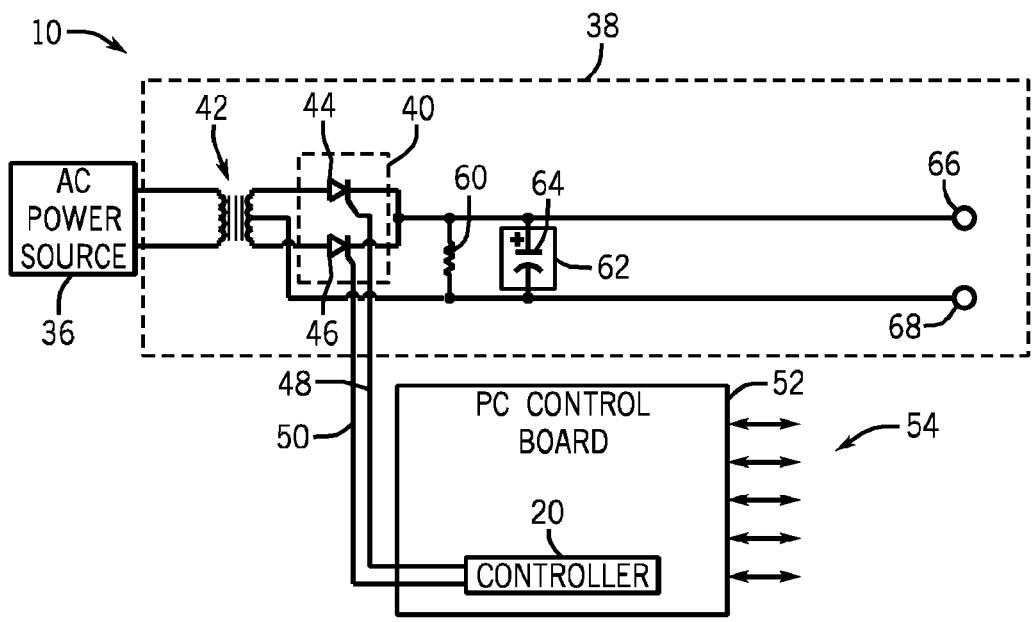
FIG. 3 is another diagrammatical representation of exemplary circuitry that may be used in the welding power source of FIG. 1.

FIG. 3 is another diagrammatical representation of exemplary circuitry that may be used in the welding power source 10 of FIG. 1. In this embodiment, the switching circuitry 40 is disposed on the secondary winding side of the transformer 42. The output power from the SCRs 44 and 46 is applied to one side of the resistor 60 and the capacitive circuit 62, and is connected to output terminal 66. The other side of the resistor 60 and the capacitive circuit 62 are connected to output terminal 68. Power from the AC power source goes directly to the primary winding side of the transformer 42.

Figure 4:
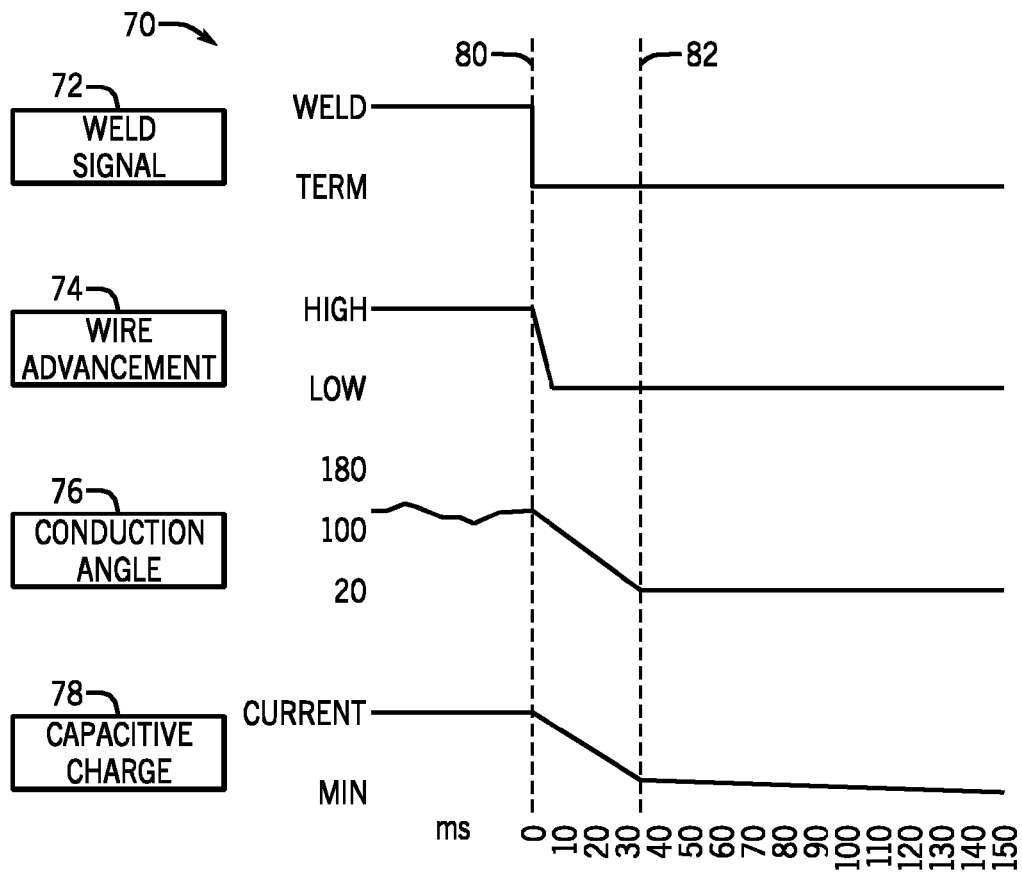
FIG. 4 is a timing diagram depicting aspects of an exemplary welding arc termination.

FIG. 4 is a timing diagram 70 depicting aspects of an exemplary welding arc termination. A weld signal 72 is depicted, with the signal switching from welding to termination of welding. The welding level signifies that an operator is pressing a welding trigger, while the termination level signifies that the operator has released the welding trigger. Likewise, a wire advancement 74 is depicted switching from high to low. The high position signifies that wire is advancing at a selected wire feed speed, while the low position signifies that wire is not advancing. At positions between high and low, the wire speed may be between the selected wire feed speed and stopped (i.e., the wire is being fed, but is slowing). A conduction angle 76 is depicted and may range from 0 to 180 degrees. A capacitive charge 78 (of the capacitive circuit) is depicted with a current and a minimum.

The following description relating to the timing diagram 70 is one example of the timing that may occur when a welding operation is terminated. The weld signal 72 switches from high to low at time 80 which correlates on this diagram to approximately 0 milliseconds (in practice, the transition requires some small amount of time). The weld signal 72 then remains low, indicating that the welding operator has terminated a weld, and would like to terminate the welding arc. The wire advancement 74 remains high (normal wire feed) until time 80 where the wire advancement declines until the wire advancement is completely stopped. The conduction angle 76 fluctuates between approximately 110 and 160 degrees until time 80, as required by the welding process settings. The conduction angle 76 is then ramped down from its then-current level (e.g., in this example, approximately 130 degrees) to a desired low angle (e.g., approximately 20 degrees) between time 80 and time 82, approximately 35 milliseconds. In certain embodiments, the discharge time may be approximately 20 to 50, 25 to 40, or 30 to 45 milliseconds. During the conduction angle rampdown, the weld arc continues, fed by the current from the switches, which is being continuously reduced. Therefore, the capacitive charge 78 ramps down between time 80 and time 82. After time 82, the capacitive charge 78 continues to decrease towards the minimum charge as the capacitive charge 78 is discharged by the resistor.

Figure 5:
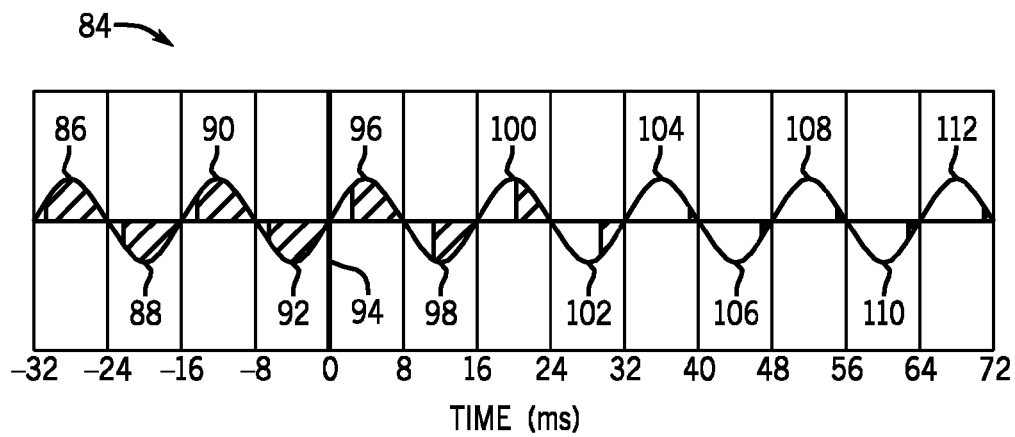
FIG. 5 is a phase diagram depicting aspects of an exemplary welding arc termination.

FIG. 5 is a phase diagram 84 depicting aspects of an exemplary welding arc termination. This phase diagram depicts an example of the conduction angle of the SCRs before and after a signal indicating an operator intention to terminate a welding arc is received by a welding power supply controller. Each half cycle that is described relates to approximately 180 degrees of input from an AC waveform. Half cycle 86 depicts a positive half cycle with approximately a 160 degree conduction angle, while half cycle 88 depicts a negative half cycle with approximately a 150 degree conduction angle. Further, half cycle 90 has approximately a 155 degree conduction angle; while half cycle 92 has approximately a 160 degree conduction angle. At time 94, a weld signal is received indicating an operator intention to terminate a welding arc. As can be seen with half cycles 86, 88, 90, and 92, the conduction angle during a welding operation may fluctuate in order to maintain a constant voltage output. At time 94, the conduction angle begins a decline from 160 degrees to 20 degrees. Therefore, at half cycle 96 the conduction angle is approximately 130 degrees, while at half cycle 98 the conduction angle is approximately 100 degrees. Then at half cycle 100, the conduction angle is approximately 70 degrees, while at half cycle 102 the conduction angle is approximately 40 degrees. By half cycle 104, the conduction angle has reduced to approximately 20 degrees where the angle remains for half cycles 106, 108, 110, and 112. It should be noted that this phase diagram was based on a 60-Hz AC cycle. As such, each half cycle is approximately 8 milliseconds. Furthermore, the conduction angle rampdown occurred over approximately 5 half cycles. In certain embodiments, the conduction angle rampdown may occur over approximately 3 to 8, 3 to 6, or 4 to 5 half cycles.

Figure 6:
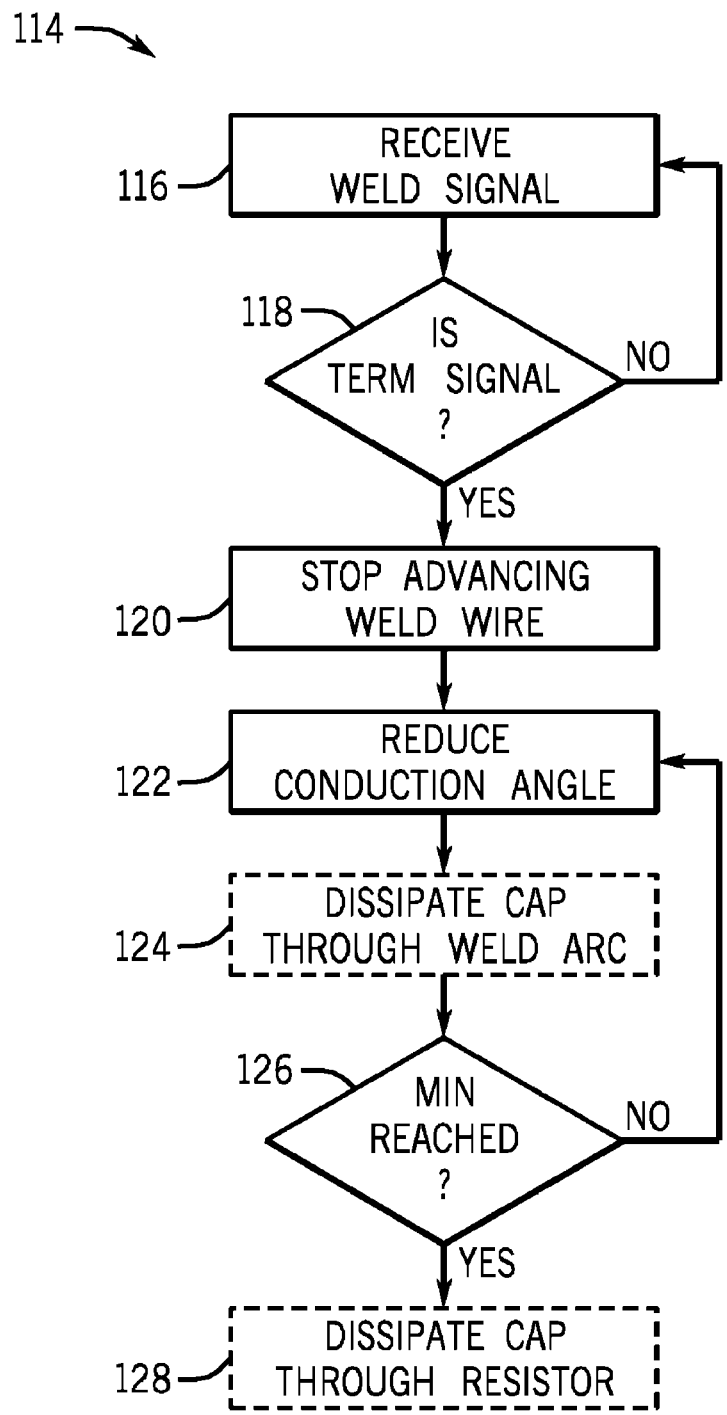
FIG. 6 is a flow chart of a welding arc termination method.

FIG. 6 is a flow chart of a welding arc termination method 114. At step 116, a controller receives a weld signal indicating an operator intention to terminate or continue a welding arc. Then at step 118, the controller determines whether the weld signal is a termination signal. If the signal is not a termination signal, the method returns to step 116. If the signal is a termination signal, at step 120, the controller stops advancing welding wire. Next, at step 122, the controller reduces a conduction angle for switching of solid state switches that generate welding power. At step 124, energy stored in a capacitive circuit coupled to welding power may be dissipated by continuing the welding arc. Then, at step 126, the controller determines if the minimum conduction angle has been reached. If the minimum conduction angle has not been reached, the method continues to reduce the conduction angle by returning to step 122. If the minimum conduction angle is reached, at step 128, residual energy stored in the capacitive circuit may be dissipated through a resistor coupled in parallel with the capacitive circuit.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a welding process, comprising:
receiving a signal indicating an operator intention to terminate a welding arc;
stopping advance of a welding wire in response to the signal; and
progressively reducing a conduction angle through multiple successive half cycles of an input AC waveform in response to the signal, wherein the conduction angle is used to switch solid state switches that generate welding power, and progressively reducing the conduction angle reduces the welding power generated by the solid state switches.

2. The method of claim 1, comprising reducing the conduction angle for switching of the solid state switches from a conduction angle utilized when the signal is received to a predetermined minimum conduction angle.

3. The method of claim 2, comprising reducing the conduction angle for switching the solid state switches from the conduction angle utilized when the signal is received to the predetermined minimum conduction angle within a predetermined time.

4. The method of claim 3, wherein the predetermined time corresponds to between 3 and 6 half cycles of the input AC waveform.

5. The method of claim 4, wherein the predetermined time is between approximately 20 and 50 milliseconds.

6. The method of claim 3, wherein the predetermined minimum conduction angle is approximately 20 degrees.

7. The method of claim 1, comprising dissipating energy stored in a capacitive circuit coupled to welding power by continuation of the welding arc during the reduction of the conduction angle.

8. The method of claim 7, comprising dissipating residual energy stored in the capacitive circuit through a resistor coupled in parallel with the capacitive circuit.

9. The method of claim 1, wherein the solid state switches are coupled on a primary side of a welding power supply transformer.

10. The method of claim 1, wherein the solid state switches are coupled on a secondary side of a welding power supply transformer.

11. A welding system, comprising:
a welding power supply configured to generate welding power for an arc welding application, the welding power supply comprising solid state switches that generate welding power, and a capacitive circuit coupled to the welding power;

a welding torch for initiating feed of a welding wire for the arc welding application; and control circuitry configured to receive a signal from the torch indicating an operator intention to terminate a welding arc, to stop advance of a welding wire in response to the signal, and to progressively reduce a conduction angle through multiple successive half cycles of an input AC waveform in response to the signal, wherein the conduction angle is used to switch solid state switches that generate welding power to dissipate energy stored in the capacitive circuit through the welding arc, and progressively reducing the conduction angle reduces the welding power generated by the solid state switches.

12. The system of claim 11, comprising a resistor in parallel with the capacitive circuit and configured to dissipate residual energy stored in the capacitive circuit.

13. The system of claim 11, wherein the control circuitry is configured to reduce the conduction angle for switching of solid state switches from a conduction angle utilized when the signal is received to a predetermined minimum conduction angle.

14. The system of claim 13, wherein the control circuitry is configured to reduce the conduction angle for switching of solid state switches from the conduction angle utilized when the signal is received to the predetermined minimum conduction angle within a predetermined time.

15. The system of claim 14, wherein the predetermined time is between approximately 20 and 50 milliseconds.

16. A computer implemented method for controlling a welding process, comprising:

receiving a signal indicating an operator intention to terminate a welding arc;

stopping advance of a welding wire in response to the signal; and progressively reducing a conduction angle through multiple successive half cycles of an input AC waveform in response to the signal.

17. The method of claim 16, wherein progressively reducing the conduction angle comprises reducing the conduction angle for switching of solid state switches from the conduction angle utilized when the signal is received to a predetermined minimum conduction angle within a predetermined time.

18. The method of claim 17, wherein progressively reducing the conduction angle for switching of solid state switches comprises adjusting a potentiometer setting.

19. The method of claim 16, comprising dissipating energy stored in a capacitive circuit coupled to welding power by continuation of the welding arc during the reduction of the conduction angle.

20. The method of claim 19, comprising dissipating residual energy stored in the capacitive circuit through a resistor coupled in parallel with the capacitive circuit.

* * * * *